(12) United States Patent
Janer Angelet et al.

(10) Patent No.: US 11,820,059 B2
(45) Date of Patent: Nov. 21, 2023

(54) ULTRASONIC DEVICE FOR A POLYMER INJECTOR APPARATUS

(71) Applicant: Fundacio Eurecat, Cerdanyola del Valles (ES)

(72) Inventors: Marcel Janer Angelet, Barcelona (ES); Jose Antonio Marfil Romero, Cornella de Llobregat (ES); David Montes Cobo, Sabadell (ES); Francisco Javier Planta Torralba, El Masnou (ES)

(73) Assignee: Fundacio Eurecat, Cerdanyola del Valles (ES)

( * ) Notice: Subject to any disclaimer, the term of this patent is extended or adjusted under 35 U.S.C. 154(b) by 173 days.

(21) Appl. No.: 17/264,028

(22) PCT Filed: Jul. 12, 2019

(86) PCT No.: PCT/EP2019/068838
§ 371 (c)(1),
(2) Date: Jan. 28, 2021

(87) PCT Pub. No.: WO2020/025293
PCT Pub. Date: Feb. 6, 2020

(65) Prior Publication Data
US 2021/0308920 A1    Oct. 7, 2021

(30) Foreign Application Priority Data

Jul. 30, 2018   (EP) .................................. 18382572

(51) Int. Cl.
B29C 45/56    (2006.01)
(52) U.S. Cl.
CPC ...... B29C 45/568 (2013.01); *B29C 2791/008* (2013.01)

(58) Field of Classification Search
None
See application file for complete search history.

(56) References Cited

U.S. PATENT DOCUMENTS

| | | |
|---|---|---|
| 3,717,427 A | 2/1973 | Bodine |
| 4,500,280 A | 2/1985 | Astier et al. |
| (Continued) | | |

FOREIGN PATENT DOCUMENTS

| | | | |
|---|---|---|---|
| CN | 101579910 A | * | 11/2009 |
| DE | 10153706 | | 7/2003 |
| WO | WO2018085675 | | 5/2018 |

OTHER PUBLICATIONS

Bingyan CN101579910A 2009 English Translation (Year: 2009).*
European Patent Office Search Report and Written Opinion for PCT/EP2019/068838, dated Oct. 7, 2019, entire document.

*Primary Examiner* — Jacob T Minskey
*Assistant Examiner* — Adrien J Bernard
(74) *Attorney, Agent, or Firm* — Allen, Dyer, Doppelt & Gilchrist, P.A.

(57) ABSTRACT

An ultrasonic device comprising a fusion chamber (10) with an inlet bore (11) for a polymer in pellet, powder or tablet form, a plunger that modifies the volume of the fusion chamber, an outlet bore (12) that communicates with a mould (60), a sonotrode bore (13) through which a distal portion (21) of an ultrasonic head (20) is inserted into the fusion chamber, wherein the distal portion is separated from the rest of the ultrasonic head by a first nodal plane (PN1) in correspondence of a first surface (S1) in contact with a complementary surface of a ring seal (30) that closes the fusion chamber, the ultrasonic head including a second nodal plane (PN2) away from and parallel to the first nodal plane in correspondence of or adjacent to a second surface (S2) wherein an anchoring device (40) presses the ultrasonic head against the ring seal ensuring a tight closure.

15 Claims, 2 Drawing Sheets

(56) References Cited

U.S. PATENT DOCUMENTS

| | | |
|---|---|---|
| 5,068,068 A | 11/1991 | Furusawa et al. |
| 6,036,467 A | 3/2000 | Jameson |
| 6,336,803 B1 * | 1/2002 | Funger ............... B26D 7/086 |
| | | 425/141 |
| 2006/0165832 A1 | 7/2006 | Allan et al. |

* cited by examiner

ULTRASONIC DEVICE FOR A POLYMER INJECTOR APPARATUS

FIELD OF THE ART

The present invention relates to the field of ultrasonic devices for polymer—thermoplastic, for instance—injector apparatuses, wherein the ultrasonic device melts and fluidifies polymer pellets, powder or tablets within the fusion chamber wherein a plunger presses the melted polymer obtained for its injection within a moulding cavity in communication with said fusion chamber.

STATE OF THE ART

Ultrasonic devices are known in the industry for the melting and fluidification of polymers, typically including an ultrasonic transducer generating ultrasonic vibration and an ultrasonic head that transmits said vibration.

The inclusion of a distal portion of an ultrasonic device is known within a fusion chamber to melt or fluidify a polymer, a fusion chamber of an injector apparatus provided with a loading opening for polymer in pellet, powder or tablet form, for example, a plunger to push the polymer against the ultrasonic head, producing its melting, and to increase the pressure of the melted polymer inside said fusion chamber, and an outlet bore connected to a mould, such that the melted polymer flows within said mould.

In this type of device, a distal portion of the ultrasonic device, distal relative to the ultrasonic transducer, is inserted within the fusion chamber through a sonotrode bore. To keep the melted polymer from being filtered through said inlet bore, a ring seal is arranged retained around a section of the ultrasonic head. To reduce the interference of the ring seal with the vibration of the ultrasonic head said ring seal is attached in a proximal position to a nodal plane of the ultrasonic head.

Frequently, said ring seal retains the ultrasonic head in a radial direction so that, to increase the contact surface between the ring seal and the ultrasonic head, the ring seal will cover adjacent areas of the nodal plane, where the vibration amplitude is not zero, causing the wear of said ring seal. Document EP1536936B1 shows a solution of this type.

In other alternative solutions, the ultrasonic head will be provided, coinciding with said nodal plane, with an annular projection in the shape of a flange surrounding it. The ring seal is attached above and underneath said flange retaining it and achieving a tight sealing. Document U.S. Pat. No. 6,036,467A, for example, shows a solution of this type.

However, said flange has a certain thickness and, therefore, its upper and lower surfaces, where the ring seal is attached, are not coplanar with the nodal plane, but are adjacent thereto; therefore the vibration amplitude in those two planes will not be zero, but, being reduced, a certain vibration will exist that produces a deterioration of the ring seal over time. Additionally, the manufacturing of the ultrasonic head provided with said flange entails a complication and the increase in cost thereof.

BRIEF DESCRIPTION OF THE INVENTION

The present invention relates to an ultrasonic device for an extrusion machine of polymers, a thermoplastic polymer, for example.

It is understood that an ultrasonic device is a device that comprises an ultrasonic transducer, which makes an ultrasonic head vibrate which, placed in contact with a fusible material, melts it and fluidifies it by the effect of the vibration and the heat generated by said vibration.

It will be understood that an injector apparatus of a polymer is an apparatus intended to pressurize a melted polymer into a mould through an outlet bore of a fusion chamber that houses part of the ultrasonic device. The inclusion of an ultrasonic device in contact with the polymer in a position proximal to the outlet bore, upstream thereof, such that the polymer be treated by the ultrasonic device before being injected into the mould is known.

In the present invention, the proposed ultrasonic device includes, in a manner known per se in the industry
- a fusion chamber provided with a loading opening of polymer in pellet, powder or tablet form, an actuated plunger displaceable within the fusion chamber modifying the volume of said fusion chamber, an outlet bore of melted polymer connected to a mould, and a sonotrode bore;
- an ultrasonic head that includes at least one sonotrode, the ultrasonic head being provided with a distal portion and with a proximal portion separated by a first nodal plane, wherein the distal portion is totally constituted by said sonotrode and is inserted in the fusion chamber through the sonotrode bore projecting in cantilever into the fusion chamber, the distal portion being intended to remain in contact with the polymer contained in the fusion chamber, and wherein the proximal portion, which is at least partially constituted by said sonotrode, remains outside the fusion chamber and in connection with an ultrasonic transducer and includes at least a second nodal plane away from and parallel to the first nodal plane; and wherein,
- a ring seal in contact with the ultrasonic head in coincidence with the first nodal plane and the ring seal being configured to seal the fusion chamber sonotrode bore containing the melted pressurized polymer.

It will be understood that the ring seal may be circular, or have any other closed geometric shape.

The ultrasonic device fluidifies and homogenises the polymer before its injection into the mould to ensure that there is no presence of non-melted material and that its texture is homogenous before its injection.

In order to achieve the injection, the polymer is inserted in the form of pellets, powder or tablets within a fusion chamber through a loading opening, the loading opening is sealingly closed, and a plunger contained within said fusion chamber is displaced, by the operation of a driving device such as a piston, for example, reducing the inner volume of the fusion chamber as a result of the pressurized contact between the polymer and the distal portion of the ultrasonic device housed within said fusion chamber, causing the polymer to melt and fluidify. An additional displacement of the plunger will push the melted polymer through the outlet bore causing its injection within the mould, producing a microinjected polymer piece.

The ultrasonic device consists of an ultrasonic transducer in contact with an ultrasonic head that transmits the vibration to the inner portion being projected within the fusion chamber, where it remains in contact with the polymer.

The ultrasonic head is provided with a distal portion, contained within the fusion chamber, and a proximal portion, arranged outside the fusion chamber, the entire ultrasonic head being subjected to an ultrasonic vibration in the shape of a stationary wave.

In any body subjected to a vibration in the shape of a stationary wave, one or several planes are generated wherein the vibration is zero; these planes are known as nodal.

Between the distal portion and the proximal portion there is a first nodal plane, and the proximal portion of the ultrasonic head also includes a second nodal plane parallel to and away from the first nodal plane.

In the present case, the distal portion of the ultrasonic head is within the fusion chamber, in contact with the melted pressurized polymer. To keep said melted polymer from flowing outside the fusion chamber through the fusion chamber sonotrode bore instead of through the outlet bore, a ring seal is arranged around the ultrasonic head, coinciding with the first nodal plane where the vibration is zero. This avoids the ring seal from interfering with the vibration of the ultrasonic head, while avoiding the wear of said ring seal due to the vibration.

However, the present invention proposes, in a way unknown to the state of the art, that:
the first nodal plane be coplanar with a first annular surface of the ultrasonic head on which an annular surface of the ring seal rests parallel to the first surface;
the second nodal plane be coplanar with or coplanar to a second surface of the ultrasonic head on which an anchoring device, in cooperation with a pressure device, applies pressure that is transmitted to the ring seal through the proximal portion of the ultrasonic head, producing a tight sealing of the fusion chamber.

Thus, it is proposed that the ultrasonic head be provided with a first annular surface coplanar to the first nodal plane where, therefore, the vibration will be zero in all points of its surface, and with a second surface, annular or not, coplanar or adjacent to the second nodal plane. Therefore, said first and second surfaces are parallel to each other.

The second surface may be defined, for example, in an annular bulge in the shape of a flange around the ultrasonic head, or in an annular slot or step created in said ultrasonic head.

A pressure device will apply pressure on the second surface of the ultrasonic head through an anchoring device attached to or resting on said second surface of the ultrasonic head where, thanks to its correspondence of or proximity to the second nodal plane, the amplitude of the vibration will be zero or reduced.

The pressure applied by the pressure device will be perpendicular to the first and second surfaces of the ultrasonic head, and will push the second surface in the direction of the first surface.

The first surface of the ultrasonic head will be in contact with an annular surface of the ring seal and will be pressed against it thanks to the pressure applied by the pressure device, achieving a tight sealing between both surfaces that will not be affected by the vibration of the ultrasonic head, since the first surface coincides with the first nodal point and, therefore, the amplitude of the vibration is zero on all its surface.

According to an embodiment of the invention, the proximal portion of the ultrasonic head may be partially constituted by an ultrasonic amplifier sandwiched between the sonotrode and the ultrasonic transducer.

In such a case, it is not recommended that the second nodal plane should coincide with the joint between the ultrasonic amplifier and the sonotrode, since greater stresses exist in this region that could damage the joint between both elements.

Alternatively, it is also contemplated that all of the proximal portion of the ultrasonic head is constituted by the sonotrode, no ultrasonic amplifier existing.

In any case, the distal portion of the ultrasonic head will have a smaller cross section than the proximal portion of the ultrasonic head, and in the transition between the smaller cross section distal portion and the larger cross section proximal portion, the first annular surface of the ultrasonic head, coinciding with the first nodal plane, will be defined.

It is also contemplated that a third annular surface be arranged around the fusion chamber sonotrode bore in contact with another annular surface of the ring seal and opposite to the first annular surface of the ultrasonic head.

In such a case, the ring seal will be a tubular body, not necessarily circular, retained between the first annular surface and the third annular surface thanks to the pressure applied by the pressure device, which will avoid the leakage of melted polymer through both gaskets.

The third annular surface may define an annular seat configured to provide a precise positioning of the ring seal.

Preferably, the ring seal will be metallic or ceramic, which makes it much more resistant to high temperatures and to the vibration compared with other materials such as the majority of plastics. The use of metal or ceramic to form said ring seal is possible thanks to its contact with the ultrasonic head being produced exactly by the first nodal plane where the amplitude of the vibration is zero. Attaching the ring seal in another other surface of the ultrasonic head, even if it were in a position adjacent to the first nodal plane, would subject said ring to vibrations that require the use of materials with a certain degree of flexibility, such as some types of plastic or rubber, but which, with vibrations and temperature, suffer from wear and cause leakages of melted polymer.

According to another embodiment, the ring seal defines an inner gap with a larger cross section than the cross section of the distal portion of the sonotrode, said size difference between both elements preferably being equal or lower than 2.5 mm. This size difference allows the vibration of the distal portion in its interior without it interfering with the walls of the ring seal arranged surrounding it. Additionally, this space will form an annular duct in communication with the rest of the fusion chamber, lengthening it, that will be filled with polymer. Within said annular duct, the vibration amplitude of the distal portion will be smaller the closer it is to the first nodal plane, getting to be zero. This means that the polymer contained in said annular duct will solidify in the area coinciding with the first surface of the ultrasonic head, cooperating with the sealing of the gasket, avoiding polymer leaks therethrough.

Preferably, said plunger will have a displacement stroke in a direction perpendicular to the first nodal plane of the ultrasonic head, and will be aligned with said sonotrode.

The fusion chamber, the plunger and the distal portion of the ultrasonic head will, preferably, be cylindrical, the diameter of the distal portion of the ultrasonic head being smaller than the diameter of the fusion chamber, generating an annular cavity around it.

According to an embodiment of the invention, the outlet bore of the fusion chamber is adjacent to the ring seal, therefore being in communication with the inter-gap existing between the distal portion of the ultrasonic head and the fusion chamber, and, preferably, in a more proximal position to the first surface of the ultrasonic head than to the cantilevered distal end of the distal portion of the ultrasonic head. This causes the need for the melted polymer to flow along most of the distal portion of the ultrasonic head before reaching the outlet bore, thus ensuring a correct application of the vibration on this material, achieving an optimal and homogenous melting and flowability.

According to another embodiment, the mould and the outlet bore of the fusion chamber will be defined by an upper half mould and by a lower half mould in a coupled position.

In an uncoupled position said upper and lower half moulds will allow access to the interior of said mould and to the outlet bore for the removal of a moulded piece with a solidified polymer and of the contents of the outlet bore.

Preferably, the fusion chamber sonotrode bore, and a portion of the same fusion chamber is also defined in the upper half mould. The rest of the fusion chamber may remain in the upper half mould, in the lower half mould or in another body attached to said half moulds.

It will be considered that the space contained between the distal portion of the ultrasonic head and the surrounding ring seal, which will be filled with polymer, will also form part of the fusion chamber.

The pressure device of the anchoring device may include a number of connectors attached by one end to the anchoring device and by another end attached to the upper half mould, anchoring the ultrasonic head and the ring seal thereto. This will allow to maintain the ultrasonic device attached to the upper half mould during the mould opening tasks for the removal of the produced piece, which allows for a much faster production rate.

In the case that the fusion chamber is totally or partially defined in the lower half mould, the opening of the mould will produce the removal of the distal portion of the ultrasonic head from within the fusion chamber, leaving an aperture of the portion of the fusion chamber contained in the lower half mould accessible, which may be used as a loading opening for the insertion of polymer in pellet, powder or tablet form within the fusion chamber after the removal operations of the previously produced piece from the mould. By re-coupling the upper and lower half moulds, the loading opening will be newly sealed by the upper half mould, the production cycle being liable to be restarted.

Alternatively, it is contemplated that the opening of the sonotrode and the loading opening be the same opening. In such a case, the pressure device will preferably include a quick release system that allows to release and remove the ultrasonic head from the body where the fusion chamber is defined, or from the upper or lower half mould.

By way of example, it is considered that the pressure device could include a number of connectors attached by one end to the anchoring device and by another end to a body that contains the fusion chamber or to the supper or lower half mould. The force applied by the connectors will compress the proximal portion of the ultrasonic head ensuring the correct sealing of the fusion chamber. Preferably, the force produced by the pressure device will be adjustable.

An exemplary embodiment of the pressure device may consist of multiple bars arranged around the ultrasonic head, perpendicular to the first and second nodal planes, that serve as a guide for an axial displacement of the anchoring device, and a number of tightening devices that allow to apply an amount of stress to the ultrasonic head. The anchoring device may be, for example, a flat plate parallel to the first and second nodal planes with a hole to allow the passage of a part of the ultrasonic head therethrough supporting a peripheral part of said hole on the second surface of the ultrasonic head.

If said flat plate constitutive of the anchoring device included a number of through holes in its periphery through which the described bars could be inserted as part of the pressure device, said bars would be able to guide the axial displacement of the anchoring device. If, in addition, the bars were threaded and nuts were included as tightening devices, pressure could be adjusted to that the ultrasonic head adjusting said nuts is subjected to.

Other solutions are also contemplated, such as, for example, the use of plungers or springs.

Other characteristics of the invention will appear in the following detailed description of an exemplary embodiment.

BRIEF DESCRIPTION OF THE FIGURES

The foregoing and other advantages and characteristics will be more completely understood from the following detailed description of an exemplary embodiment with reference to the attached drawings, which must be taken by way of illustration and not limitation, wherein.

DETAILED DESCRIPTION OF AN EXEMPLARY EMBODIMENT

Figure 1:
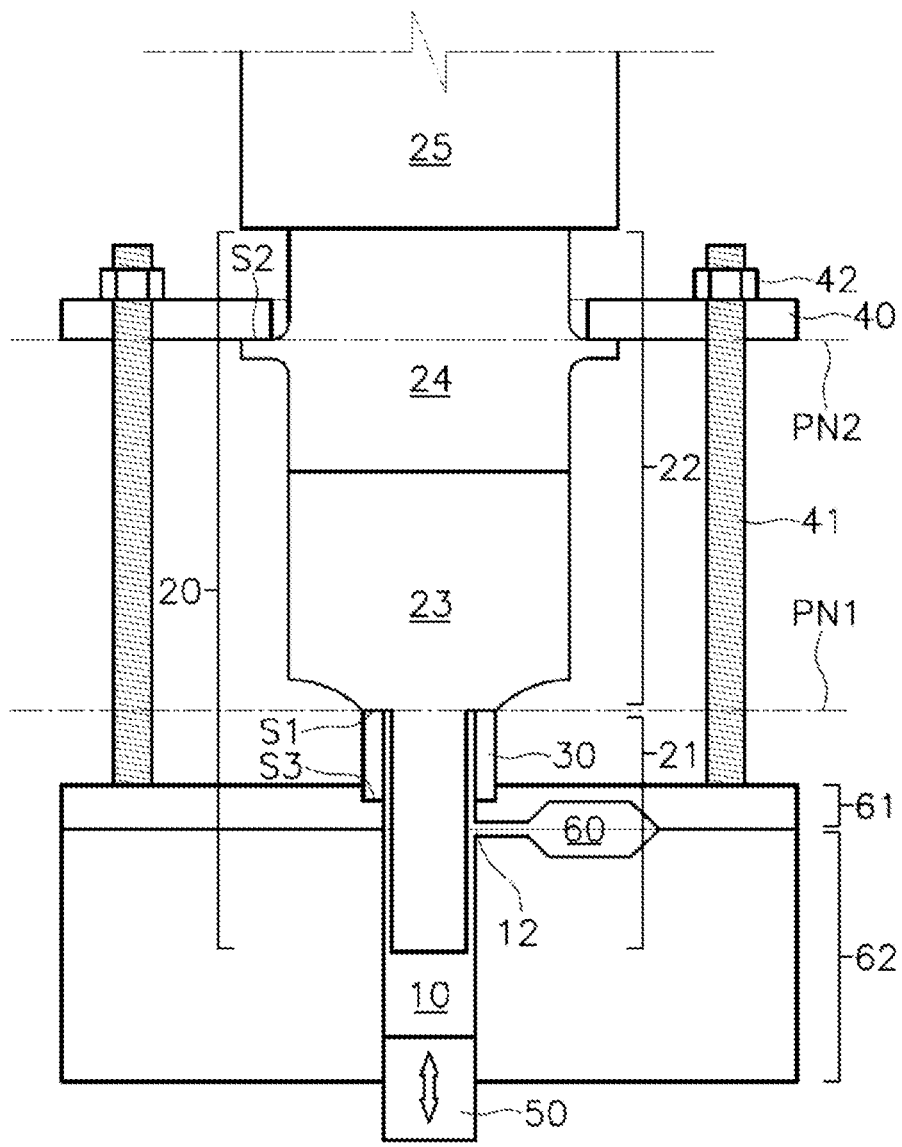
FIG. 1 shows a schematic cross section of the ultrasonic device wherein the direction in which the plunger is displaced is indicated by means of an arrow.
Figure 2:
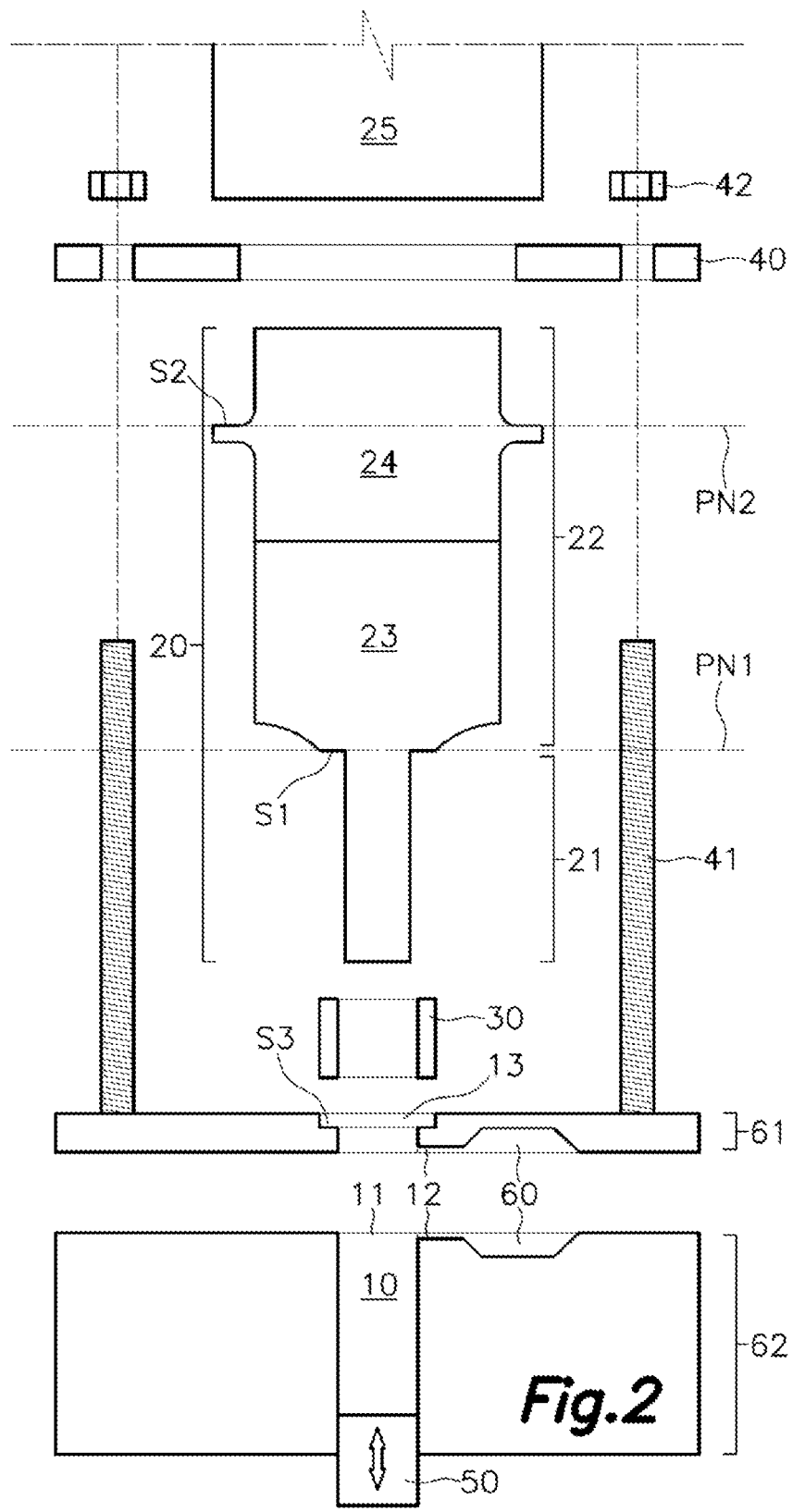
FIG. 2 shows the same ultrasonic device of FIG. 1 but in an exploded view.

The attached figures show exemplary embodiments with an illustrative non-limiting character of the present invention.

According to a preferred embodiment, the proposed ultrasonic device will be specially adapted for its use in a polymer injector apparatus.

Said injector apparatus consists of a fusion chamber 10 provided with a loading opening 11 of polymer in pellet, powder or tablet form, that can be sealingly closed with a closure element, an outlet bore 12 in connection with a cavity that defines a mould 60 of one piece to be produced, a sonotrode bore 13 through which a distal portion 21 of an ultrasonic head 20 of an ultrasonic device inserted within the fusion chamber 10, and a plunger 50 that allows to modify the inner volume of the fusion chamber 10. All of it allows that, after the feeding of polymer in pellet, powder or tablet form within the fusion chamber 10 and the closure of the loading opening 11, the actuation of the plunger 50 to push the polymer against the distal portion 21 of the ultrasonic head 20, which, by means of its vibration, will cause the polymer to melt and fluidify. The additional displacement of the plunger 50 will push the melted polymer through the outlet bore 12 filling the mould 60.

The proposed ultrasonic device is formed by a vibration-generating ultrasonic transducer 25 in connection with an ultrasonic head 20 to which it transmits the generated vibration.

Said ultrasonic head 20 will be formed, in turn, by an ultrasonic amplifier 24 in direct contact with the ultrasonic transducer 25, and by a sonotrode 23 connected to said ultrasonic amplifier 24.

A distal portion 21 of the ultrasonic head 20, corresponding to a portion of the sonotrode 23, will be contained within the fusion chamber 10 inserted projecting in cantilever into it through the sonotrode bore 13, said distal portion 21 remaining in contact with the polymer contained in the fusion chamber 10 to which vibration is applied causing its fluidification and homogenization before being injected in the mould 60 through the outlet bore 12. The rest of the ultrasonic head 20 constitutes a proximal portion 22 that remains outside the fusion chamber 10.

The ultrasonic transducers 25 typically generate a vibration in the shape of a sinusoidal wave that spreads in the ultrasonic head 20 in the shape of a stationary wave. Any body subjected to a stationary wave generates one or several nodal planes wherein the vibration amplitude will be zero at all times.

The proposed ultrasonic head 20 will be configured so that a first nodal plane PN1 is defined between the distal portion 21 and the proximal portion 22. This allows that, in correspondence of said first nodal plane PN1, a ring seal 30 may be arranged around the ultrasonic head 20, and in contact therewith, thus sealing the sonotrode bore 13, keeping the melted pressurized polymer contained in the chamber 10 from flowing towards the outside the chamber 10 therethrough.

Said ring seal 30 could affect the vibration of the ultrasonic head 20, or said vibration could affect the sealing produced by the ring seal 30. For this reason, it is proposed that the ring seal 30 consist of a tubular body through which the distal portion 21 of the ultrasonic head 20 is inserted, said tubular body being provided with an annular surface of the ring seal 30 parallel and coplanar to the first nodal plane PN1 of the ultrasonic head 20. The ultrasonic head 20 is also provided with a first annular surface S1 coplanar with the first nodal plane PN1 complementary with the annular surface of the ring seal 30, forming a seal.

In an assembled position, the ultrasonic head 20 is arranged with its first annular surface S1 resting on and in contact with the annular surface of the ring seal 30.

Said surfaces being coplanar with the first nodal plane PN1, the vibration amplitude on all points of said annular surface will be equal to zero, so that the sealing produced between both will not be affected by the vibration of the ultrasonic head 20.

The ultrasonic head 20 will also be configured to generate, in its proximal portion 22, a second nodal plane PN2 parallel to and separated from the first nodal plane PN1. Preferably, said second nodal plane PN2 will be away from the joint between the sonotrode 23 and the ultrasonic amplifier 24, to avoid subjecting said joint to excessive stresses that may damage the joining means, such as, for example, a threaded joint.

The ultrasonic head 20 will also be provided with a second surface S2 parallel to the first surface S1 and coplanar or adjacent to the second nodal plane PN2, such that the vibration amplitude in the second surface S2 will be zero or highly reduced.

The second surface S2 may be formed by multiple second partial surfaces, all of them coplanar to each other, forming an annular discontinuous surface, without this affecting the invention.

An anchoring device 40, which in this embodiment it is proposed to be a flat plate provided with a central through hole through which parte of the ultrasonic head 20 goes, is placed resting on an in contact with the second surface S2, the periphery of said central hole remaining in contact with the second surface S2 of the ultrasonic head 20.

A pressure device 41 applies pressure to said anchoring device 40 in a direction perpendicular to the first and second nodal planes PN1 and PN2, that is transmitted to the ultrasonic head 20 through the second surface S2, compressing part of the ultrasonic head 20 against the ring seal 30, thus ensuring that the pressure of the melted polymer contained in the chamber 10 does not cause leaks through the joint of the ring seal 30 with the first surface S1 of the ultrasonic head 20. Preferably, the pressure exerted by the pressure device 41 will be greater than the pressure of the melted polymer of the chamber 10.

The arrangement of the first surface S1 and the geometry of the ring seal 30, together with the compression direction applied on the ultrasonic head 20, produces a sealing between the ultrasonic head 20 and the ring seal 30 in an axial direction of said ultrasonic head 20, instead of in a radial direction, as is common in the art.

In the present embodiment, the pressure device 41 consists of at least two bars parallel to each other and perpendicular to the first and second nodal planes PN1 and PN2 of the ultrasonic head 20 that have an end attached to a body that contains the fusion chamber 10 and an end that traverses through holes of the anchoring device 40, allowing for the guidance of the anchoring device in an axial direction defined by the bars.

Said bars will preferably be threaded bars and will be provided with a number of nuts as a tightening device 42 that will allow to shift the anchoring device 40 towards the body that contains the fusion chamber 10 compressing the sandwiched ultrasonic head 20. Alternatively, it is contemplated that the threaded bars may rotate, driven by a motor for example, the nuts being attached to or integrated in the anchoring device 40.

According to the present embodiment, the body that contains the fusion chamber 10 is formed by an upper half mould 61, which partially defines the cavity of the mould 60 and of the outlet bore 12, as well as the sonotrode bore 13, in combination with a lower half mould 62 that defines the rest of the cavity of the mould 60 and of the outlet bore 12 and that contains the rest of the fusion chamber and the plunger 50. The filling opening 11 is included in the lower half mould 62, namely in the aperture of the portion of the fusion chamber contained in the lower half mould 62 to which the part of the upper half mould 61 containing the sonotrode bore 13 is coupled.

When both upper and lower half moulds are coupled, the fusion chamber 10, the cavity of the mould 60 and the outlet bore 12 are connected and complete and an injection operation may be carried out. However, when they are separated, the interior of the fusion chamber 10, of the mould 60 and of the outlet bore 12 remain accessible allowing for the removal of any amount of solidified polymer that they might contain. Additionally, the filling opening 11 will remain open, allowing for the insertion of more polymer in pellet, powder or tablet form for a new injection operation.

Preferably, the pressure device 41 will be attached to the upper half mould 61 such that the opening of the mould 60 may be carried out without having to separate the ultrasonic head 20 from the anchoring device 40, accelerating and simplifying the production and cleaning tasks.

It is also proposed that the ring seal 30 be an independent piece of the upper half mould 61 where the sonotrode bore 13 is located, thus facilitating its maintenance and replacement. In such a case, the upper half mould 61 will be provided, around the sonotrode bore 13, with a third surface S3 parallel and opposite to the first surface S1 of the ultrasonic head 20, and the ring seal 30 will also have an annular flat surface configured to remain seated on the third surface S3, retaining the ring seal 30 between the ultrasonic head 20 and the upper half mould 61. The pressure applied by the pressure device 41 ensures that both gaskets of the ring seal 30 are sealed, avoiding the ejection of the melted polymer.

It will be understood that the different parts that constitute the invention described in an embodiment may be freely combined with the parts described in other different embodiments even if such a combination has not been explicitly described, provided that no prejudice exists in the combination.

The invention claimed is:

1. An ultrasonic device for a polymer injector apparatus including:
   a fusion chamber with a sonotrode bore;
   an ultrasonic head including a distal portion, housed in cantilever in the fusion chamber and inserted through the sonotrode bore, a proximal portion disposed outside the fusion chamber, the distal portion and at least part of the proximal portion constituting a sonotrode;
   an ultrasonic transducer connected to the proximal portion of the ultrasonic head;
   a first nodal plane disposed coplanar with an annular-shaped first surface of the ultrasonic head, the first nodal plane defined between the distal portion and the proximal portion and a second nodal plane coplanar with a second surface of the ultrasonic head, parallel to the annular-shaped first surface of the ultrasonic head, and included in the proximal portion away from the first nodal plane;
   a ring seal disposed around the sonotrode bore of the fusion chamber and comprising a first annular surface disposed coplanar to the first nodal plane, and an anchoring device attached to the second surface of the ultrasonic head, and
   a pressure device connected at least to the anchoring device and configured to compress at least part of the proximal portion of the ultrasonic device between the first and second nodal planes, the pressure device further configured to press the annular-shaped first surface of the ultrasonic head against the first annular surface of the ring seal and to press the ring seal against the surrounding of the sonotrode bore in a direction perpendicular to the annular-shaped first surface of the ultrasonic head, producing a tight sealing of the sonotrode bore of the fusion chamber.

2. The device according to claim 1, wherein the proximal portion of the ultrasonic head is at least partially constituted by an ultrasonic amplifier sandwiched between the sonotrode and the ultrasonic transducer.

3. The device according to claim 2, wherein the second nodal plane is away from a joint between the sonotrode and the ultrasonic amplifier.

4. The device according to claim 1, wherein the distal portion of the ultrasonic head has a smaller diameter than the proximal portion of the ultrasonic head, and wherein a transition between the smaller diameter distal portion and the larger diameter proximal portion defines the annular-shaped first surface of the ultrasonic head.

5. The device according to claim 1, wherein the fusion chamber is provided with a third surface, which is annular, around the sonotrode bore opposite the annular-shaped first surface of the ultrasonic head, and wherein the ring seal is a tubular body retained between the annular-shaped first surface of the ultrasonic head and the third surface of the fusion chamber.

6. The device according to claim 5, wherein the third surface of the fusion chamber defines an annular seat configured to provide precise positioning of the ring seal.

7. The device according to claim 5, wherein the ring seal is metallic or ceramic.

8. The device according to claim 5, wherein the ring seal defines an inner gap with a larger cross section than the cross section of the distal portion of the ultrasonic head.

9. The device according to claim 1, wherein the fusion chamber includes a plunger with a displacement stroke in a direction perpendicular to the first nodal plane of the ultrasonic head and aligned with said sonotrode.

10. The device according to claim 1, wherein the fusion chamber includes a plunger and wherein the fusion chamber, the plunger and the distal portion of the ultrasonic head are cylindrical, the diameter of the distal portion of the ultrasonic head being smaller than the diameter of the fusion chamber, generating an annular cavity around it.

11. The device according to claim 1, wherein the the fusion chamber includes an outlet bore is adjacent to the ring seal.

12. The device according to claim 1, wherein the fusion chamber includes an outlet bore for melted polymer connected to a mould, the mould including an upper half mould and a lower half mould, wherein the mould and the outlet bore allow, in an uncoupled position, access to the inside of said mould and of the outlet bore for the removal of a moulded piece and of the content of the outlet bore.

13. The device according to claim 12, wherein the sonotrode bore is defined in the upper half mould, and wherein the pressure device of the anchoring device includes a number of connectors attached by one end to the anchoring device and attached by another end to the upper half mould, anchoring the ultrasonic head and the ring seal thereto.

14. The device according to claim 12, wherein a portion of the fusion chamber contained in the lower half mould includes a loading opening for polymer.

15. The device according to claim 13, wherein an aperture of a portion of the fusion chamber contained in the lower half mould includes a loading opening for polymer.

* * * * *